(12) United States Patent
Eismann et al.

(10) Patent No.: US 10,976,448 B2
(45) Date of Patent: Apr. 13, 2021

(54) REFERENCE-VOLTAGE SYSTEM FOR A RADIATION DETECTOR

(71) Applicant: Siemens Healthcare GmbH, Erlangen (DE)

(72) Inventors: Alfons Eismann, Pinzberg (DE); Peter Kaemmerer, Schnaittach (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 88 days.

(21) Appl. No.: 16/407,322

(22) Filed: May 9, 2019

(65) Prior Publication Data

US 2019/0346574 A1 Nov. 14, 2019

(30) Foreign Application Priority Data

May 14, 2018 (DE) .......... 10 2018 207 418

(51) Int. Cl.
*G01T 1/161* (2006.01)
*G01T 1/175* (2006.01)

(52) U.S. Cl.
CPC .............. *G01T 1/175* (2013.01); *G01T 1/161* (2013.01)

(58) Field of Classification Search
CPC ................................. G01T 1/161; G01T 1/175
See application file for complete search history.

(56) References Cited

U.S. PATENT DOCUMENTS

2014/0027606 A1 1/2014 Raynor et al.
2017/0322619 A1 11/2017 Eismann et al.

FOREIGN PATENT DOCUMENTS

DE 102014213047 A1 1/2016
DE 102016207904 A1 11/2017
WO WO 2016194286 A1 12/2016

OTHER PUBLICATIONS

Analog Devices, "Ultralow Noise, LDO XFET Voltage References with Current Sink and Source, Data Sheet ADR440/ADR441/ADR443/ADR444,ADR445", Rev. E, 2010, p. 1-20. (Year: 2010).*
Referenzspannung via Stecker; English translation "Reference voltage via plugs".
German Office Action for German Application No. 102018207418.6 dated Jan. 21, 2019.

* cited by examiner

*Primary Examiner* — Mark R Gaworecki
(74) *Attorney, Agent, or Firm* — Harness, Dickey & Pierce, P.L.C.

(57) ABSTRACT

A reference-voltage system is for a radiation detector. The reference-voltage system includes a voltage reference; and a plurality of sensor units, each sensor unit of the plurality of sensor units including one or more sensor elements, and the voltage reference being configured to provide a reference voltage for the plurality of sensor units. A voltage reference is further provided to provide a reference voltage for a plurality of sensor units. A radiation detector, a medical imaging modality and a method for operating the modality are also described.

25 Claims, 3 Drawing Sheets

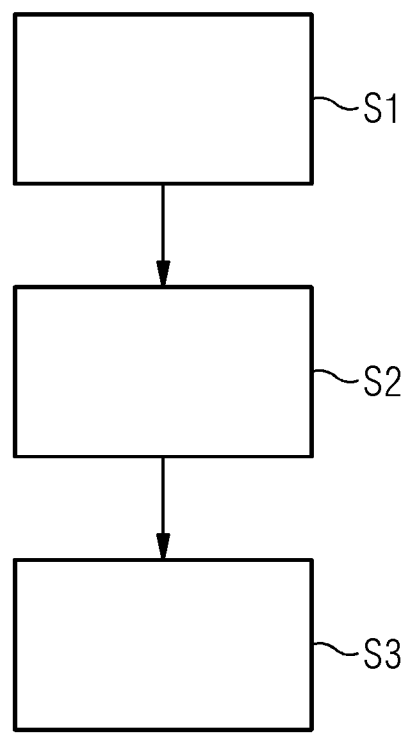

REFERENCE-VOLTAGE SYSTEM FOR A RADIATION DETECTOR

PRIORITY STATEMENT

The present application hereby claims priority under 35 U.S.C. § 119 to German patent application number DE 102018207418.6 filed May 14, 2018, the entire contents of which are hereby incorporated herein by reference.

FIELD

Embodiments of the invention generally relate to a reference-voltage system for a radiation detector, to a radiation detector, to a medical imaging modality, to a method for operating said modality, and to the use of a reference-voltage system for providing a reference voltage.

BACKGROUND

Achieving ever lower manufacturing costs is a given when developing radiation detectors, for instance X-ray detectors for CT systems (computed tomography systems). In this context, the main costs (~80%) of a CT detector lie with the sensor board. This usually contains the direct-converting or indirect-converting sensor material, if necessary photodiodes and the evaluation electronics (ASIC "application-specific integrated circuit").

The evaluation electronics often comprise ASICs in the form of integrating analog-to-digital converters, which need a clean supply voltage, i.e. a supply voltage that is low in interference. This is needed to ensure an excellent conversion performance from analog to digital. The function of the analog-to-digital converter is to convert the current, for instance supplied from the photodiode, into a digital data stream. In the photodiode, the incident X-ray radiation causes the UFC ceramic to generate current, which therefore constitutes a measurement signal of the CT acquisition.

In the CT sensors that have integrated ASICs, particular importance is attached to what is known as the voltage reference chip. These chips are high-precision devices, exhibit very low temperature drift and provide the CT sensors with a reference voltage that is particularly low in interference and free of noise. The analog-to-digital converters of today have a resolution of 20 bits and higher. Hence given a voltage range of 2.5 V, a single bit equates to a voltage of just 2.4 µV. This high-precision conversion performance illustrates the importance of supplying a reference voltage in a manner that is as noise-free and low in interference as possible.

Document DE 10 2014 213 047 A1 discloses an X-ray detector having a detector array that has a planar design and comprises a plurality of detector sensor modules arranged adjacent to one another, with each detector sensor module comprising a plurality of detector sensor elements, which partition the detector sensor module on the basis of pixels, and discloses a system for supplying a high voltage to the detector sensor modules, where for each individual detector sensor module there exists one high-voltage supply module supplying solely this detector sensor module.

DE 10 2016 207 904 A1 discloses a detector facility for a medical imaging system. The detector facility comprises a plurality of individual detectors and at least one detector control unit. The detector facility is designed such that it can be switched into at least one energy saving mode, in which at least some of the components of the individual detectors are inactive while at least some of the components of the detector control unit are not inactive.

In previously disclosed CT detectors, each CT-sensor is assigned a dedicated voltage reference chip in order to ensure conditions that are as optimum as possible for a low-noise and interference-free supply of a reference voltage. This aims to minimize interference effects that increase with the size of each supplied circuit. The standard voltage reference chips, however, constitute a not insignificant cost component in the manufacture of a CT detector.

SUMMARY

At least one embodiment of the present invention defines a cheaper way of supplying a reference voltage for a radiation detector.

Embodiments of the present invention are directed to a reference-voltage system, a radiation detector, a medical imaging modality, a method for operating a medical imaging modality, and a use of a reference-voltage system for providing a reference voltage.

The reference-voltage system mentioned in the introduction for a radiation detector comprises just one voltage reference and a plurality of sensor units. In this system, the voltage reference provides a reference voltage for the plurality of sensor units.

Thus, in contrast with the prior art, in at least one embodiment of the present invention, a single voltage reference supplies a plurality of sensor units. Within the meaning of embodiments of the invention, a voltage reference refers to a voltage source that outputs to further electronic components connected thereto, a precisely defined voltage in a particularly low-noise and substantially interference-free manner. "Precisely defined" means here that any deviations are very small with respect to the value provided as an absolute value.

In at least one embodiment, a reference-voltage system for a radiation detector comprises a voltage reference and a plurality of sensor units, wherein each sensor unit of the plurality of sensor units includes one or more sensor elements, and wherein the voltage reference provides a reference voltage for the plurality of sensor units.

At least one embodiment is directed to a radiation detector, in particular a CT detector, having a number of reference-voltage systems of at least one embodiment.

At least one embodiment is directed to a medical imaging modality, in particular a CT device, having a radiation detector of at least one embodiment.

At least one embodiment is directed to a method for operating a medical imaging modality having a radiation detector, which comprises a reference-voltage system having a voltage reference, a plurality of sensor units and a supply-voltage source, wherein method comprises:

applying an operating voltage to the voltage reference via the supply-voltage source;

applying a supply voltage to the sensor unit via the supply-voltage source; and applying a reference voltage to the sensor unit via the voltage reference.

At least one embodiment is directed to method comprising:

using a voltage reference to provide a reference voltage for a plurality of sensor units of a reference-voltage system having a voltage reference, the plurality of sensor units and a supply-voltage source.

BRIEF DESCRIPTION OF THE DRAWINGS

The invention is described again below in greater detail using example embodiments and with reference to the accompanying figures. Identical components are denoted by the same reference numbers in the various figures, which are generally not shown to scale and in which:

FIG. 5 shows a method flow diagram of a method for operating a medical imaging modality comprising a radiation detector.

DETAILED DESCRIPTION OF THE EXAMPLE EMBODIMENTS

Figure 1:
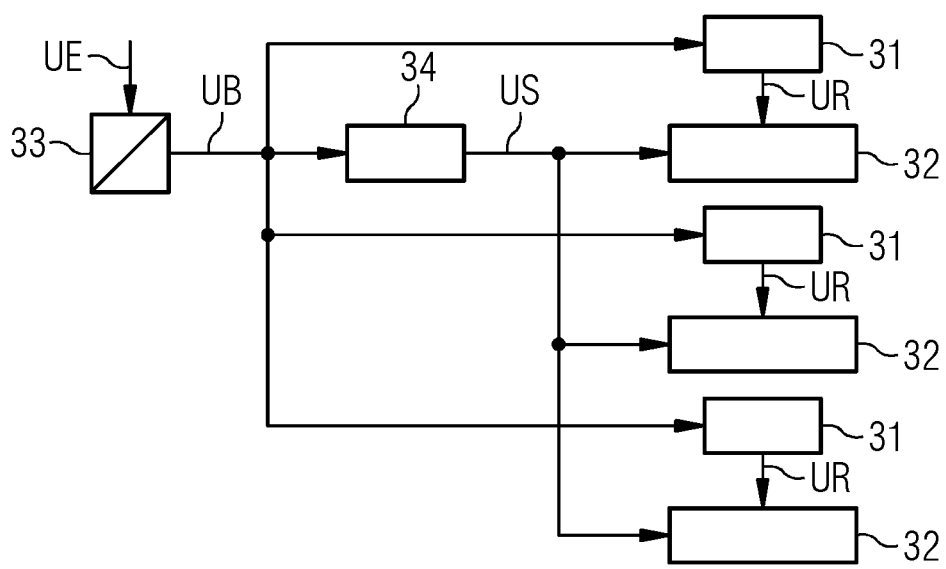
FIG. 1 shows a schematic block diagram of a voltage supply according to the prior art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

In this context, a sensor unit of at least one embodiment comprises a sensor element, for instance a directly converting, possibly photon-counting and/or energy-resolving, semiconductor sensor (e.g. Si, GaAs, CdTe, CdZnTe, $HgI_2$, a-Se, etc.), or a combination of photodiode and scintillator. In addition, the sensor unit preferably comprises an evaluation unit, which comprises in particular an integrating analog-to-digital converter, for instance in the form of an ASIC.

In addition to the voltage reference and the plurality of sensor units, the reference-voltage system can also comprise other components, as is explained in greater detail later.

Thus the invention departs from the concept that was standard practice until now of each sensor unit also being assigned one voltage reference. This is because according to the invention, one voltage reference is shared by a plurality of sensor units. A plurality is understood to mean here a number that is greater than 1, so for instance 2, 4, 6, 8, 16, and so on.

Hence according to at least one embodiment of the invention, precisely one voltage reference is used to provide a reference voltage for a plurality of sensor units. In other words, only one voltage reference is assigned to a plurality of sensor units for the purpose of supplying a reference voltage.

Care must be taken here that the effects of any coupled-in interference do not become too large, and to dimension the circuits accordingly. In exchange, however, the reference-voltage system according to the invention advantageously allows a considerable cost saving compared with the prior art.

The radiation detector comprises a number of reference-voltage systems according to at least one embodiment of the invention.

Its operating principle can be based on any mechanism for interaction of the electromagnetic radiation with matter, so the radiation detector can be embodied as a standard X-ray detector, for example. In particular, however, it is a CT detector (computed tomography detector), preferably comprising the sensor elements already mentioned above.

When designing a radiation detector according to the invention, considerations about the number of sensor units supplied per voltage reference can advantageously, depending on the requirements for use, balance the interference sensitivity against the cost saving.

The medical imaging modality comprises a radiation detector according to at least one embodiment of the invention. It can be designed as a simple X-ray device or a C-arm X-ray device, for example. In particular, however, it is a CT device (computed tomography device).

In the method according to at least one embodiment of the invention is for operating a medical imaging modality, the modality comprising a radiation detector, which in turn comprises a reference-voltage system. Said reference-voltage system comprises a voltage reference, a plurality of sensor units and a supply-voltage source.

The method of at least one embodiment for operating the medical imaging modality comprises at least the steps described below. A supply voltage is applied to the voltage reference via the supply-voltage source. A further supply voltage is applied to the sensor unit via the supply-voltage source. In addition, a reference voltage is applied to the sensor unit via the voltage reference.

The supply-voltage source provides the supply to the reference-voltage system with one or more operating voltages. For example, it can be implemented as a connection to an external voltage supply, and transform and possibly rectify the external voltage, if applicable to one or more suitable operating or supply voltages.

The supply voltages for the voltage reference and for the sensor unit may be different supply voltages or even the same supply voltage, depending on the design of the system. Different supply voltages can be provided by using different transformers, for example.

Further, particularly advantageous embodiments and developments of the invention are given in the claims and in the following description, where the independent claims in one category of claims can also be developed in a similar way to the dependent claims in another category of claims and their associated passages of the description, and in particular individual features of different example embodiments or variants can also be combined to create new example embodiments or variants.

As the number of sensor units per voltage reference grows, so does the risk of capturing interference at the local level, for instance on a PCB (printed circuit board). This interference may then potentially be coupled onto the sensitive reference-voltage line. This is because as the size of the module grows, so does the overall number of fitted components, for instance components such as DC/DC converters, which exhibit certain switching operations in relevant frequency ranges. This can cause coupling into the reference-voltage system.

To prevent such interference effects, the voltage reference provides the reference voltage preferably for a maximum of 8, more preferably a maximum of 6, sensor units. Most preferably, the voltage reference provides the reference voltage for precisely 4 sensor units. The aforementioned interference effects can be reduced or avoided as far as possible by this dimensioning.

As already explained in the introduction, the reference voltage for the sensor units should be as noise-free as possible. Thus the voltage reference preferably exhibits noise of less than 10 µVpp, more preferably less than 5 µVpp, most preferably less than 2 µVpp. Despite these high requirements with regard to the noise performance of the voltage reference and the associated higher costs for the component, it is nonetheless possible using the reference-voltage system described both to provide a high quality reference-voltage supply and to achieve an advantageous cost saving overall compared with the prior art. This is because the cost component of the voltage reference is spread over a plurality of sensor units.

The generated reference voltage should also be as independent of temperature variations as possible. Thus the voltage reference preferably exhibits a temperature drift that is less than 9 ppm/° C., more preferably less than 6 ppm/° C., most preferably less than 3 ppm/° C. The reference-voltage system can thereby be operated over a relatively large temperature range advantageously without significant variations in the provided reference voltage.

In principle, the voltage reference can be any suitable electronic chip, for instance an ADR5420, MAX6143, LTC6655 or the like. Preferably, however, the voltage reference is embodied as an ADR440. This chip meets high requirements with regard to both the noise performance and the temperature drift.

The voltage reference and/or the sensor units are supplied with voltage preferably via a supply-voltage source. The voltages for the voltage reference and the sensor units can have different values in this case, as already discussed above. In addition, however, they can also have different characteristics via additional components. For example, an LDO regulator (low dropout regulator) can be used to provide the operating voltage for the sensor units as a regulated, interference-free supply voltage.

A connection of the voltage reference to a sensor unit preferably has a zero-current design. Particularly preferably, the connections between a voltage reference and all the sensor units assigned thereto each have a zero-current design.

In other words, the voltage reference preferably has its own reference ground, via which only the supply current for the voltage reference flows and not also the possibly pulsating supply current for the sensor units. In addition, the sensor units have their own sensor ground. Preferably, resistors are used to decouple the voltage reference from the sensor units. For this purpose, the voltage reference is connected, for example, via a first resistor to the supply voltage, and, if applicable, via a second resistor to the supply ground. The voltage reference is connected to the particular sensor unit via a third resistor. The resistors preferably have a high impedance compared with the connecting line. It is thereby possible to keep unavoidable alternating voltages between the sensor ground and the ground of the supply voltage away from the reference voltage.

The voltage reference and the sensor units are preferably spatially separate. In other words, the voltage reference sits, for example, on a different printed circuit board (PCB) from the sensor units, with both printed circuit boards preferably connected at a distance apart via plug-in connections. This spatial separation means it is possible to shield the voltage reference from X-ray radiation incident on the sensor elements of the sensor units. This can be achieved, for example, by introducing in the gap a suitable material such as lead, for instance. It is hence advantageously possible to provide a particularly precise reference voltage almost entirely independent of the X-ray radiation.

In the radiation detector according to at least one embodiment of the invention, the reference-voltage systems preferably each span a number of sensor modules that comprise a number of sensor units. In other words, a plurality of sensor units are combined as a module in a sensor module, and can thereby advantageously be replaced simply as a group.

FIG. 1 shows by way of example a schematic block diagram of a voltage supply known in practice for a radiation detector. An external voltage UE, for example 12 V, is divided down via a DC/DC converter to an operating voltage UB, for example 3.1 V. The operating voltage UB is applied in parallel to three voltage references 31 and to an LDO regulator 34 (low dropout regulator). The LDO regulator 34 provides a regulated interference-free supply voltage US, for example 2.5 V. Three sensor units 32 are connected in parallel to the interference-free supply voltage US. Each of the sensor units 32 is connected to a voltage reference 31 that is solely assigned to that particular sensor unit, and is thereby supplied with a reference voltage UR. Thus in total three voltage references 31 are needed to supply the three sensor units 32 with a reference voltage UR. The sensor units 32 comprise at least one sensor element or detector element and an evaluation unit, so for instance an ASIC for reading out the sensor elements (not shown here).

Figure 2:
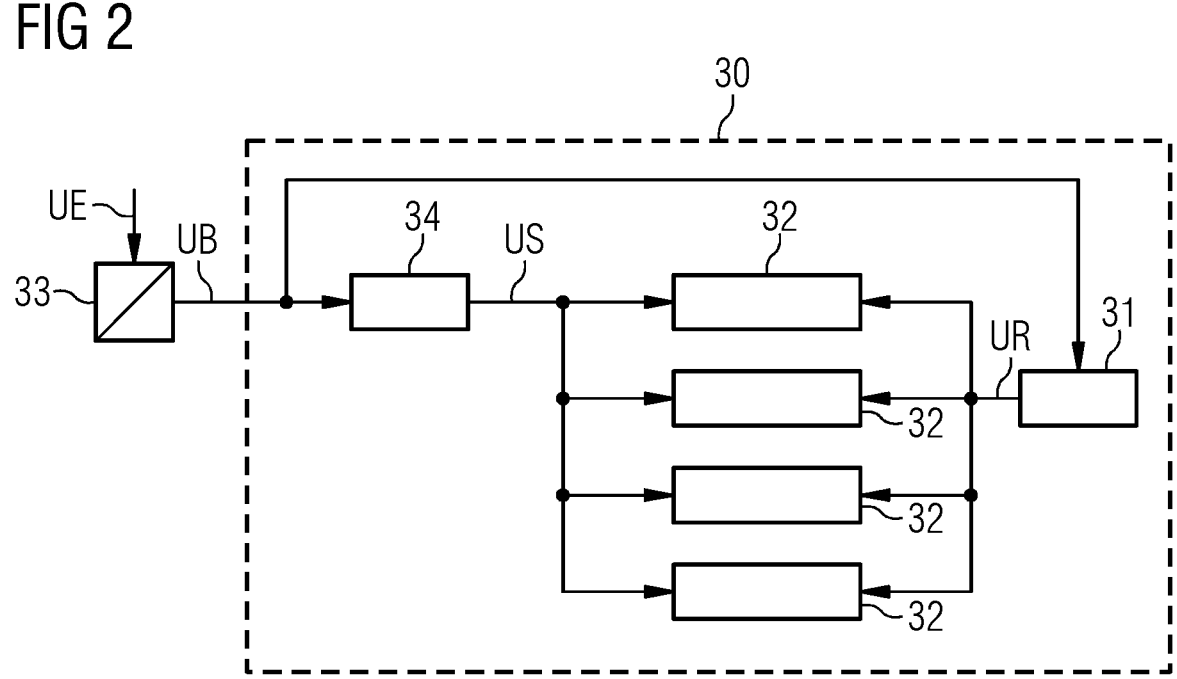
FIG. 2 shows a schematic block diagram of an example embodiment of a reference-voltage system according to the invention.

FIG. 2 shows by way of example a block diagram of a reference-voltage system 30 according to an embodiment of the invention. Like the case in FIG. 1, an operating voltage UB, for instance 3.1 V, which has been divided down via a DC/DC converter 33 from an external voltage UE, for example 12 V, is applied to the reference-voltage system 30. According to the invention, the reference-voltage system 30 comprises just one voltage reference 31, to which the operating voltage UB is applied. The operating voltage UB is also applied to an LDO regulator 34, which outputs a regulated interference-free supply voltage US of 2.5 V, for example, to four sensor units 32 in parallel. The four sensor units 32 are also connected in parallel to the precisely one voltage reference 31, obtaining thereby the reference voltage UR. Thus in contrast with the prior art shown in FIG. 1, only a single voltage reference 31 is needed here for four sensor units 32, rather than one for each sensor unit 32. Again in this case, the sensor units 32 comprise at least one sensor element or detector element and an evaluation unit, so for instance an ASIC for reading out the sensor elements (not shown here).

Figure 3:
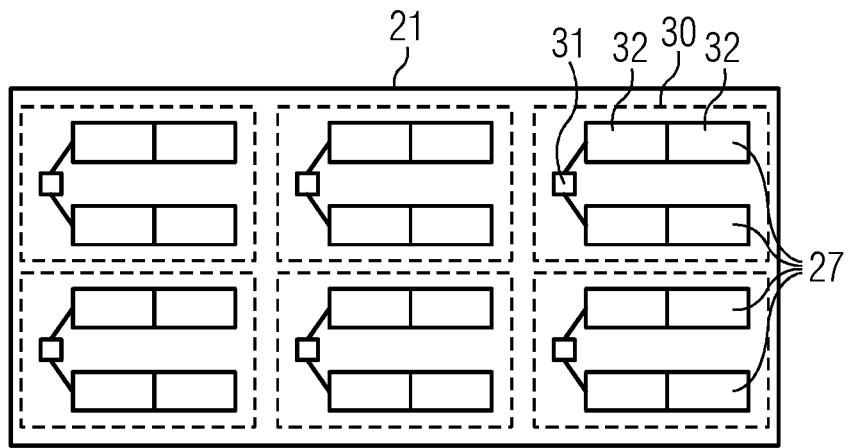
FIG. 3 shows a highly simplified diagram of an example embodiment of a radiation detector according to the invention.

FIG. 3 shows by way of example a highly simplified diagram of the design of a radiation detector 21 according to an embodiment of the invention. The radiation detector comprises six reference-voltage systems 30, which are arranged in two rows and three columns. Each of the reference-voltage systems 30 comprises two sensor modules 27. Each of the sensor modules 27 comprises two sensor units 32, which can be replaced in modular form. The two sensor modules 27 of a reference-voltage system 30 are connected to a single voltage reference 31, and their sensor units 32 are supplied with the reference voltage UR via the common voltage reference 31. The two sensor modules 27, in other words the four sensor units 32, share a voltage reference 31 and are thus assigned to one reference-voltage system 30.

Figure 4:
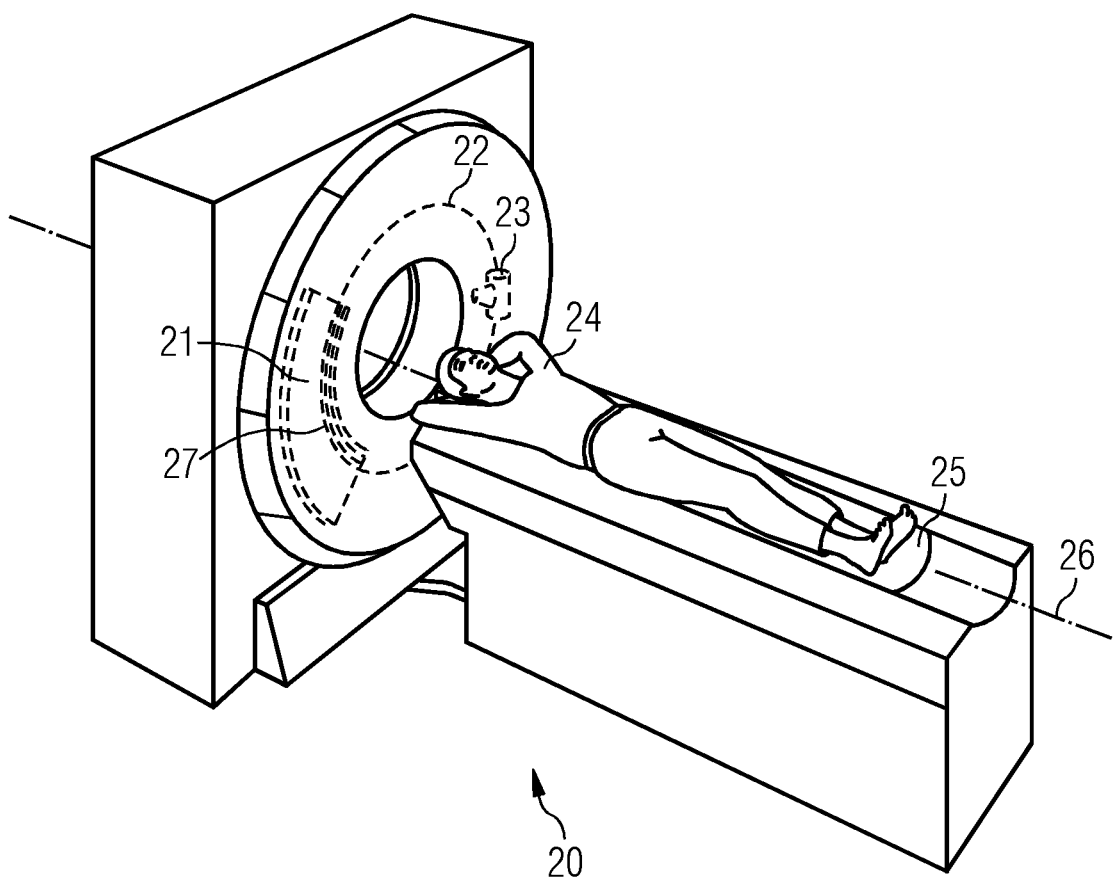
FIG. 4 shows a perspective view of an example embodiment of a medical imaging modality according to the invention.

FIG. 4 shows by way of example in a highly simplified diagram a medical imaging system 20 according to an embodiment of the invention, in this specific example a computed tomography device 20. The computed tomography device 20 comprises a patient table 25 for supporting a patient 24 as a subject under examination. The patient table 25 can be moved along a system axis 26 into the measurement field, allowing the patient 24 to be positioned in the measurement field. The computed tomography device 20 also comprises a gantry 22 having a source/radiation-detector assembly 23, 21, which is mounted such that it can rotate about the system axis 26. The source/radiation-detector assembly 23, 31 comprises an X-ray source 23 and an example embodiment of a radiation detector 21 according to an embodiment of the invention, which are oriented opposite each other such that during operation, X-ray radiation emanating from the focus of the X-ray source 23 is incident on the radiation detector 21. The radiation detector 21 is organized into individual sensor modules 27, which are arranged as modules into a plurality of radiation-detector rows. The radiation detector 21 produces a set of projection data for each projection. This projection data is then processed further and computed into a resultant image.

It is known to use a computed tomography device 20 of this type for 3D image reconstruction. In order to acquire an image of a region of interest, projection data is obtained from a multiplicity of different projection directions as the source/radiation-detector assembly 23, 21 rotates. In the case of spiral scanning, during a rotation of the source/radiation-detector assembly 23, 21, the patient table 25 moves simultaneously, for example, continuously in the direction of the system axis 26. Thus in this form of scanning, the X-ray source 23 and the radiation detector 21 move along a helical path around the patient 24. The exact design and specific manner of operation of such a CT are known to a person skilled in the art and are therefore not explained in detail here.

FIG. 5 shows a method flow diagram of a method for operating a medical imaging modality 20 having a radiation detector 21, which comprises a reference-voltage system having a voltage reference, a plurality of sensor units and a supply-voltage source. In step S1, an operating voltage UB is applied to the voltage reference via the supply-voltage source. In step S2, a supply voltage US is applied to the sensor unit via the supply-voltage source. In step S3, a reference voltage UR is applied to the sensor unit via the voltage reference.

Finally it should be reiterated that the apparatuses and methods described in detail above are merely example embodiments, which can be modified by a person skilled in the art in many ways without departing from the scope of the invention. In addition, the use of the indefinite article "a" or "an" does not rule out the possibility of there also being more than one of the features concerned. Likewise, the terms "system", "unit" and "device" do not exclude the possibility that the component in question consists of a plurality of interacting sub-components, which may also be spatially distributed if applicable.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35

U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A reference-voltage system for a radiation detector, comprising:
   a voltage reference; and
   a plurality of sensor units, each sensor unit of the plurality of sensor units including one or more sensor elements, and the voltage reference being configured to provide a reference voltage for the plurality of sensor units, wherein the radiation detector is a computed tomography (CT) detector.

2. The reference-voltage system of claim 1, wherein the voltage reference is configured to provide the reference voltage for a maximum of eight sensor units.

3. The reference-voltage system of claim 2, wherein the voltage reference is configured to exhibit noise of less than 10 μVpp.

4. The reference-voltage system of claim 2, wherein the voltage reference is configured to exhibit a temperature drift that is less than 9 ppm/° C.

5. The reference-voltage system of claim 1, wherein the voltage reference is configured to exhibit noise of less than 10 μVpp.

6. The reference-voltage system of claim 5, wherein the voltage reference is configured to exhibit noise of less than 5 μVpp.

7. The reference-voltage system of claim 6, wherein the voltage reference is configured to exhibit noise of less than 2 μVpp.

8. The reference-voltage system of claim 1, wherein the voltage reference is configured to exhibit a temperature drift that is less than 9 ppm/° C.

9. The reference-voltage system of claim 8, wherein the voltage reference is configured to exhibit a temperature drift that is less than 6 ppm/° C.

10. The reference-voltage system of claim 9, wherein the voltage reference is configured to exhibit a temperature drift that is less than 3 ppm/° C.

11. The reference-voltage system of claim 1, wherein the voltage reference is embodied as an ADR440.

12. The reference-voltage system of claim 1, wherein each respective connection of the voltage reference, to a respective sensor unit of the plurality of sensor units, has a zero-current design.

13. The reference-voltage system of claim 1, wherein at least one of the voltage reference and the plurality of sensor units is supplied with voltage via a supply-voltage source.

14. The reference-voltage system of claim 1, wherein the voltage reference and each of the plurality of sensor units are spatially separate.

15. The reference-voltage system of claim 1, wherein each sensor unit of the plurality of sensor units includes a plurality of sensor elements and at least one evaluation unit, to read out the plurality of sensor elements.

16. The reference-voltage system of claim 1, wherein the voltage reference is configured to provide the reference voltage for a maximum of four sensor units.

17. A radiation detector, comprising:
   a plurality of reference-voltage systems, each reference-voltage system of the plurality of reference-voltage systems including:
      a voltage reference; and
      a plurality of sensor units, each sensor unit of the plurality of sensor units including one or more sensor elements, and the voltage reference being configured to provide a reference voltage for the plurality of sensor unit, wherein the radiation detector is a computed tomography (CT) detector.

18. The radiation detector of claim 17, wherein each of the plurality of reference-voltage systems each span a number of sensor modules.

19. The radiation detector of claim 18, wherein each of the plurality of reference-voltage systems each span a number of sensor modules.

20. A medical imaging modality, comprising the radiation detector of claim 18.

21. A medical imaging modality, comprising the radiation detector of claim 17.

22. The medical imaging modality of claim 21, wherein the medical imaging modality is a computed tomography (CT) device.

23. A method for operating a medical imaging modality including a radiation detector, the radiation detector including a reference-voltage system having a voltage reference, a plurality of sensor units and a supply-voltage source, the method comprising:
   applying an operating voltage to the voltage reference via the supply-voltage source;
   applying a supply voltage to a sensor unit, of the plurality of sensor units, via the supply-voltage source; and
   applying a reference voltage to the sensor unit via the voltage reference.

24. A method, comprising:
   using a voltage reference to provide a reference voltage for a plurality of sensor units of a reference-voltage system of a radiation detector, wherein the radiation detector is a computed tomography (CT) detector, having a voltage reference, the plurality of sensor units and a supply-voltage source, each sensor unit of the plurality of sensor units including one or more sensor elements.

25. The method of claim 24, wherein each respective connection of the voltage reference, to a respective sensor unit of the plurality of sensor units, has a zero-current design.

* * * * *